(12) United States Patent
Lemasson et al.

(10) Patent No.: US 8,105,727 B2
(45) Date of Patent: Jan. 31, 2012

(54) BIPOLAR PLATE FOR FUEL CELL COMPRISING A CONNECTING CHANNEL

(75) Inventors: Damien Lemasson, Grigny (FR); Guillaume Joncquet, Paris (FR); Jean-Philippe Poirot-Crouvezier, Saint Georges de Commiers (FR)

(73) Assignees: Peugeot Citroen Automobiles SA, Velizy Villacoublay (FR); Commissariat a l'Energie Atomique et aux Energies Alternatives, Paris (FR)

( * ) Notice: Subject to any disclaimer, the term of this patent is extended or adjusted under 35 U.S.C. 154(b) by 757 days.

(21) Appl. No.: 11/993,876

(22) PCT Filed: Jun. 23, 2006

(86) PCT No.: PCT/FR2006/001460
§ 371 (c)(1),
(2), (4) Date: Dec. 24, 2007

(87) PCT Pub. No.: WO2007/003743
PCT Pub. Date: Jan. 11, 2007

(65) Prior Publication Data
US 2008/0318102 A1    Dec. 25, 2008

(30) Foreign Application Priority Data
Jun. 28, 2005 (FR) .................................. 05 06599

(51) Int. Cl.
*H01M 8/24* (2006.01)
(52) U.S. Cl. ........ 429/457; 429/452; 429/454; 429/456; 429/514; 429/517; 429/518

(58) Field of Classification Search ........................ None
See application file for complete search history.

(56) References Cited

U.S. PATENT DOCUMENTS

2003/0054216 A1    3/2003  Sugita et al.
2004/0028969 A1*   2/2004  Aoto .............................. 429/23

FOREIGN PATENT DOCUMENTS

DE   10347229      * 10/2003
DE   10347229 A1   5/2004
EP   1284512 A     2/2003

OTHER PUBLICATIONS

Machine translation of DE 10347229.*
International Search Report mailed Dec. 12, 2006 in PCT/FR2006/001460.

* cited by examiner

*Primary Examiner* — Cynthia Lee
(74) *Attorney, Agent, or Firm* — Nicolas E. Seckel

(57) ABSTRACT

The invention concerns a bipolar plate for fuel cell, of the type comprising a cathode bipolar half-plate and an anode bipolar half-plate attached to each other, each bipolar half-plate (1) consisting of a plate including in its central part an active region (2) and at its peripheral part a plurality of cut-outs (4) designed to form at least two oxidant boxes, at least two fuel boxes and at least two coolant boxes, the bipolar plate including at least one connecting channel between each peripheral cut-out and the active region. The invention is characterized in that each connecting channel of a peripheral cut-out with the active region consists of at least one rib (8) in a bipolar half-plate.

17 Claims, 3 Drawing Sheets

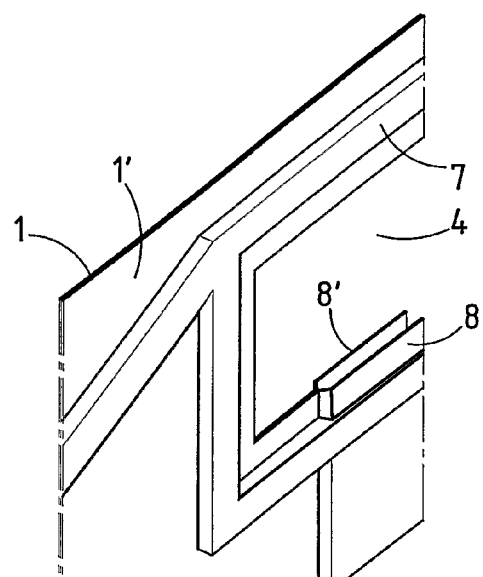
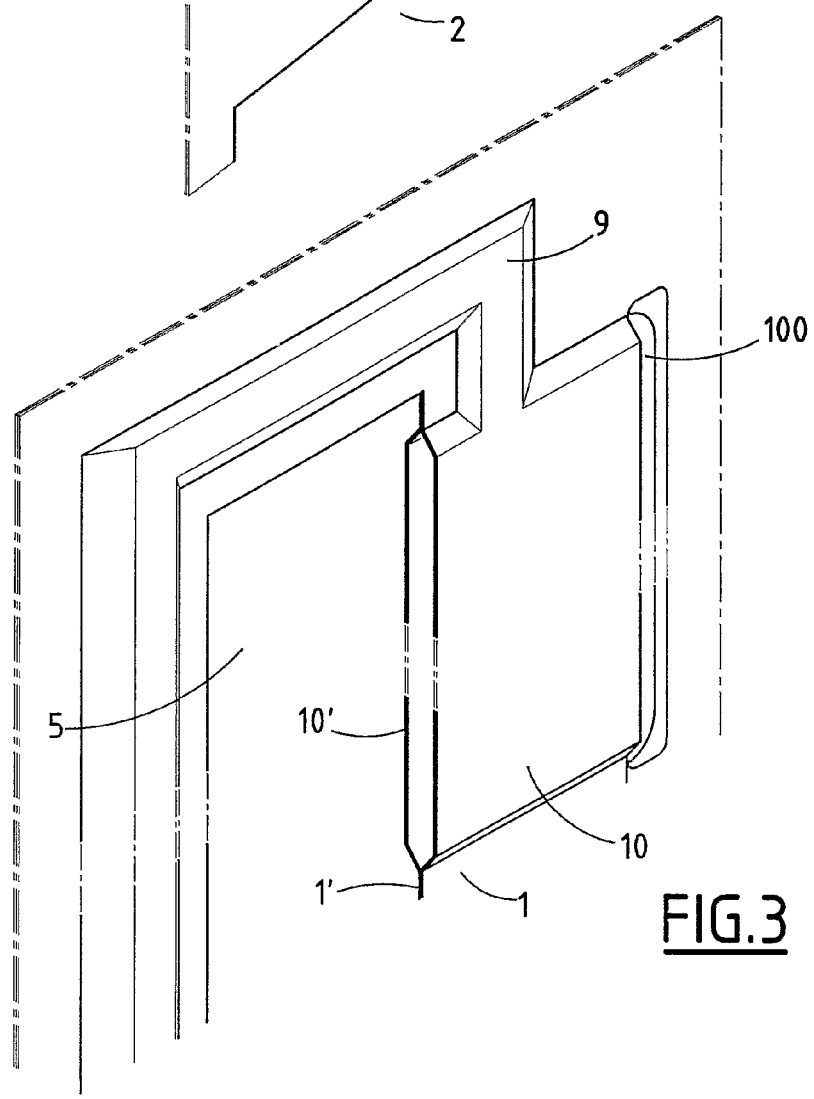

BIPOLAR PLATE FOR FUEL CELL COMPRISING A CONNECTING CHANNEL

The present invention relates to a bipolar plate for a fuel cell of the type having a proton-exchange membrane. The bipolar plate is constituted by two bipolar half-plates which are secured to each other, each bipolar half-plate being constituted by a generally rectangular plate which comprises, in the central portion thereof, an active zone and, at the peripheral portion thereof, a plurality of cut-outs which are intended to constitute fluid units, and ribs which are intended to provide sealing.

A fuel cell having a proton-exchange membrane is a device for producing electricity by means of an electrochemical reaction between a fuel, for example, a gas containing hydrogen, and an oxidant, for example, a gas containing oxygen, separated by a wall which is constituted by a solid electrolyte. In a device of this type, when the fuel is a hydrogenous gas and the oxidant is an oxygenous gas, the hydrogenous gas and the oxygenous gas react in order to form water whilst generating an electrical current which may be used for various applications.

Generally, a fuel cell is constituted by a stack of reactive cells or elementary cells which are each constituted by an electrode/membrane assembly which is inserted between two bipolar plates which comprise channels which are intended for the circulation of, on the one hand, the fuel and, on the other hand, the oxidant, and finally a heat-exchange fluid such as water. The electrode/membrane assembly is a multi-layer material which is known per se and which comprises a layer which is constituted by the membrane of solid electrolyte which is itself arranged between two active layers which constitute, on the one hand, a cathode and, on the other hand, an anode, which are themselves coated with two outer layers referred to as diffusion layers. The stack of elementary cells is generally retained in a state secured between two terminal plates which are flange-mounted by means of pins which extend from one terminal plate to the other and which extend through the stack of elementary cells.

Generally, bipolar plates are produced from materials which provide good properties in terms of resistance to corrosion and electrical conductivity. Bipolar plates are known, for example, which are produced from carbon-containing materials such as graphite, polymer impregnated with graphite or flexible sheets of graphite, shaped by means of machining or moulding. Bipolar plates are also known which are formed from metal materials, such as alloys based on titanium, aluminium or based on iron. These bipolar plates which are produced from metal material are generally plates which are shaped by means of drawing or stamping. In bipolar plates which are produced from metal sheets which are shaped by means of drawing, the intake of fluids and the discharge of by-products are carried out in zones of the bipolar plate which are locally planar, which requires the use of a frame which has a suitable shape and which can also be used to provide peripheral sealing of the bipolar plate. This technique has the disadvantage of requiring, for the same bipolar plate, in addition to two bipolar half-plates, a complementary component which is intended to provide the joint between the two bipolar half-plates and bring about the supply and discharge of fluid and a by-product. Bipolar plates which are relatively solid result.

The object of the present invention is to overcome these disadvantages by providing a bipolar plate which is produced from metal sheets which is lighter and more economical than known plates whilst allowing the fluids to be supplied and discharged in a simple manner.

To this end, the invention relates to a bipolar plate for a fuel cell comprising a cathode bipolar half-plate and an anode bipolar half-plate which are secured to each other, each bipolar half-plate being constituted by a plate which comprises, in the central portion thereof, an active zone and, at the peripheral portion thereof, a plurality of cut-outs which are intended to constitute at least two oxidant units, at least two fuel units and at least two heat-exchange fluid units, the bipolar plate comprising at least one connection channel between each peripheral cut-out and the active zone which is constituted by at least one rib in a bipolar half-plate.

Preferably, each channel for connecting a peripheral cut-out to the active zone is constituted by at least two ribs which face each other, one rib being provided in one bipolar half-plate and the other rib being provided in the other bipolar half-plate.

When a cut-out is intended to constitute a heat-exchange fluid unit, the at least one rib which constitutes the connection channel between the cut-out and the active zone opens in the active zone, between the two bipolar half-plates.

The connection channels between the oxidant units and the active zone open, in the region of the active zone, on the outer face of the cathode bipolar half-plate, for example, via a cut-out which is provided in the cathode bipolar half-plate and the connection channels between the fuel units and the active zone open, in the region of the active zone, on the outer face of the anode bipolar half-plate, for example, via a cut-out which is provided in the anode half-plate.

Preferably, the bipolar plate comprises at least one connection channel which is inclined or flared and which is arranged at the low point of at least one cut-out which is intended to form an oxidant unit.

Also in a preferred manner, the bipolar plate comprises at least one connection channel which is inclined or flared and which is arranged at the low point of at least one cut-out which is intended to form a fuel unit.

Preferably, the bipolar plate comprises inclined or flared connection channels which are arranged at any potential low point of the fuel units and oxidant units.

At least one bipolar half-plate may be a metal plate, for example of stainless steel, shaped by means of cutting, for example, using a laser, and drawing.

The invention also relates to a fuel cell of the type comprising at least one cell which is constituted by a membrane/electrode assembly which comprises at least one bipolar plate.

The invention will now be described in greater detail but in a non-limiting manner with reference to the appended Figures, in which:

FIG. 2 is an enlarged perspective view of a bipolar plate in the connection zone between a cooling fluid unit and the active zone;

FIG. 3 is an enlarged view of a bipolar plate in the connection zone between an active fluid unit and the active zone;

Figure 1:
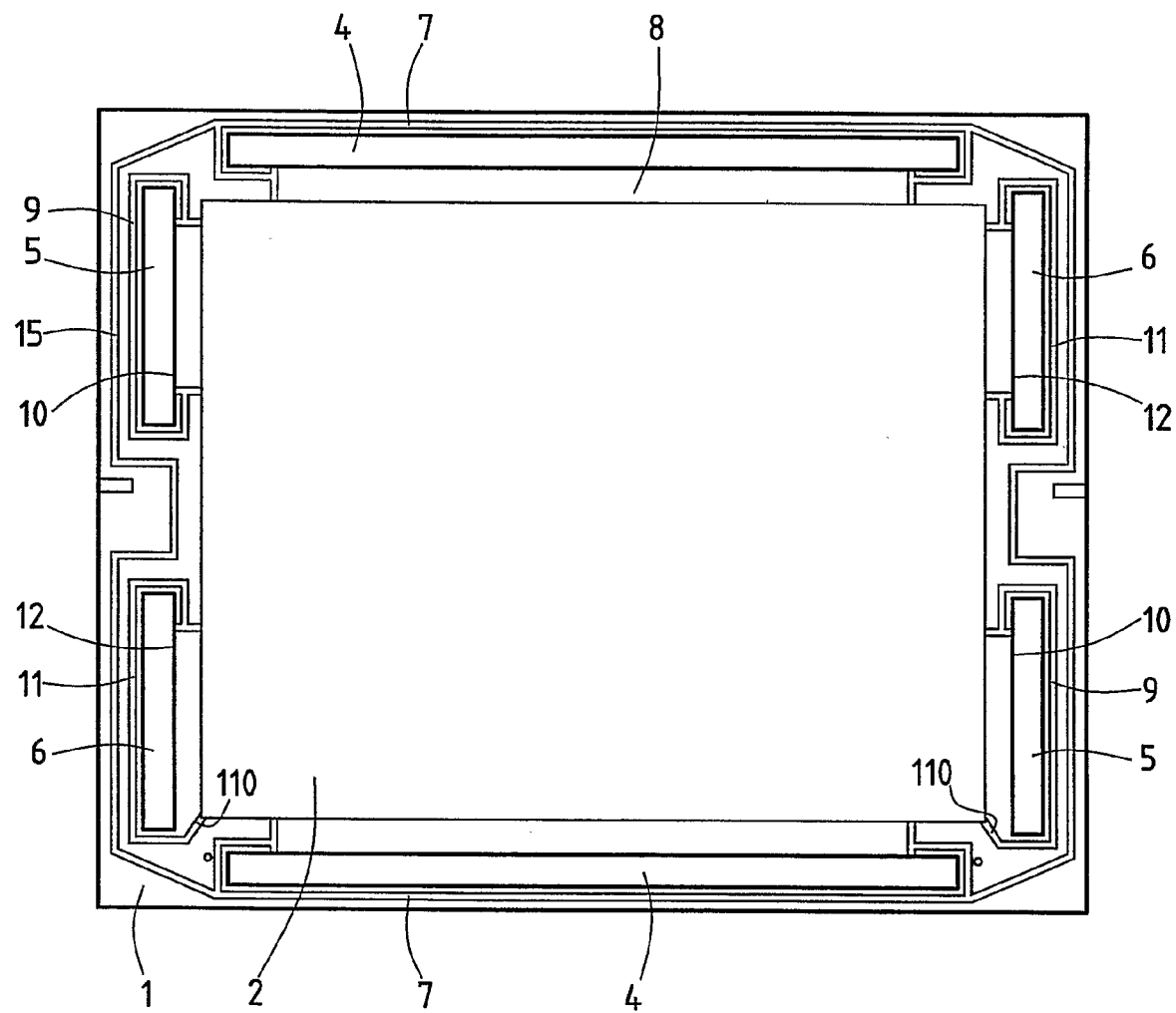
FIG. 1 is a front view of a bipolar plate.

The bipolar plate which is illustrated in FIG. 1 and of which only one face is visible, is constituted by a cathode or anode bipolar half-plate 1 and a bipolar half-plate (not visible in the Figure) which is anode or cathode, respectively, the two half-plates being secured to each other by means of the inner faces thereof. The two half-plates which have shapes which are completely comparable are each constituted by a metal plate, for example, of stainless steel, which is generally rectangular. The central portion of each bipolar half-plate constitutes an active zone which is intended to provide good distribution of the flow of the fluids on the outer surfaces of each bipolar half-plate and of the heat-exchange fluid between the two bipolar half-plates. At the peripheries thereof, the two bipolar half-plates comprise cut-outs 4, 5, 6 which are generally elongate and which are intended to provide passages for the fluid units for the supply and discharge of the various fluids required for the operation of the cell.

In particular at the upper portion and the lower portion (as illustrated in the Figure), the bipolar plates comprise cut-outs 4 which are intended to constitute the heat-exchange fluid units. The cut-out of the upper portion is, for example, intended to form the heat-exchange fluid supply unit and the lower cut-out is intended to form the heat-exchange fluid discharge unit. On the two lateral edges, the bipolar half-plates comprise cut-outs 5 and 6 which are generally elongate and which are intended to form, on the one hand, the supply and discharge units for the oxidant and, on the other hand, supply and discharge units for the fuel.

The cut-outs 4 which are intended to form the heat-exchange fluid units are surrounded by ribs 7 which protrude over the outer surface of each of the bipolar half-plates 1 and which are intended to provide the sealing. On the edge thereof which is directed towards the active zone 2, each cut-out 4 comprises a rib 8 which allows communication between the inner side of the heat-exchange fluid units and the space between the two bipolar half-plates. The heat-exchange fluid is intended to circulate in the space between the two bipolar half-plates. It must therefore enter via one of the heat-exchange fluid units, then circulate between the two plates and finally be discharged via a second heat-exchange fluid unit. As can be seen in FIG. 2, each rib 8 (or 8' of the second bipolar plate facing the rib 8) constitutes a channel which opens in the active zone 2, between the two bipolar half-plates.

In the same manner, the cut-outs which are intended to form oxidant units 5 or fuel units 6, are surrounded, on the one hand, by ribs 9 and 11 which are intended to provide the sealing, respectively, and, on the other hand, by ribs 10 and 12 which are intended to provide the communication respectively between the supply and discharge units for the oxidant or fuel, on the one hand, and the outer surfaces of the bipolar plate, on the other hand. The oxidant and fuel must circulate between the outer faces of the bipolar plates and the active membranes which are interposed between two successive bipolar plates, the oxidant circulating over the outer face of the cathode bipolar half-plate and the fuel over the outer face of the anode bipolar half-plate.

The ribs which are intended to provide communication between the oxidant or fuel units and the outer faces of the bipolar plates are ribs which, on the one hand, open inside the oxidant or fuel units and, on the other hand, open at the other end via an opening 100 which is provided in the adapted bipolar half-plate, one, corresponding to the oxidant, on the outer face of the cathode bipolar half-plate, and the other, corresponding to the fuel, on the outer face of the anode half-plate.

As can be seen in FIG. 3, it is possible to provide a rib 10 which opens via a hole 100 on a bipolar half-plate 1 and, facing this, a rib 10' which is provided in the second bipolar half-plate 1' facing the rib 10, but which does not comprise any opening in the second bipolar half-plate, in order to direct the relevant fluid towards the correct wall of the bipolar plate.

These ribs 10, 10', 12, 12' constitute supply or discharge channels for the active fluids.

Figure 4:
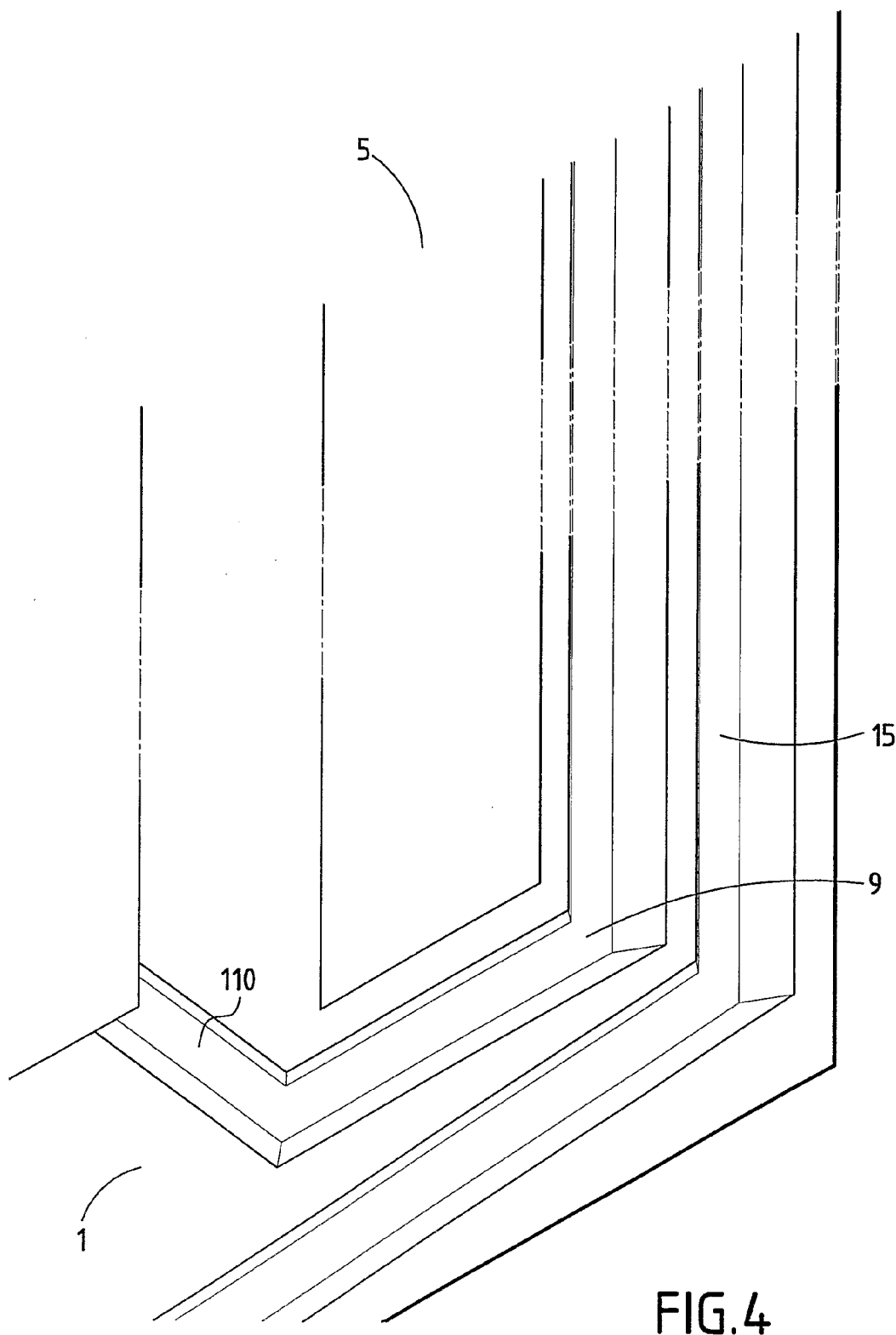
FIG. 4 is an enlarged view of a bipolar plate in the lower portion of a fluid unit which is intended to discharge oxygenous fluid.

As can be seen in FIG. 4, the fluid unit 5, when it is a discharge unit for oxidant or fuel comprises, in the lower portion thereof, an inclined or flared rib 110 which is intended to discharge the water produced by the reaction in the cell.

Generally, all the fluid units for supply or discharge of fuel or oxidant may comprise at least one inclined or flared rib which is intended to discharge the water produced by the reaction. These ribs are arranged at all the points which are capable of being low points, when the assembly direction of the bipolar plate is considered relative to the horizontal.

The invention claimed is:

1. Bipolar plate for a fuel cell comprising:
a cathode bipolar half-plate and an anode bipolar half-plate which are secured to each other,
each of said bipolar half-plates having an inner main face facing toward the other of said bipolar half-plates and an outer main face facing away from the other of said bipolar half-plates,
each of the bipolar half-plates being constituted by a respective plate which comprises, in a central portion thereof, an active zone and, in a peripheral portion thereof, a plurality of cut-outs which are intended to constitute at least two oxidant units, at least two fuel units and at least two heat-exchange fluid units, respectively,
wherein a space is provided between the active zones of the bipolar half-plates, the space being intended for circulation of a heat-exchange fluid,
wherein each of the cut-outs in each of the bipolar half-plates is located facing a respective one of the cut-outs in the other of the bipolar half-plates, so as to constitute a plurality of pairs of cut-outs in the bipolar plate,
wherein each of said pairs of cut-outs facing each other defines a respective peripheral unit zone of the bipolar plate,
wherein the bipolar plate comprises at least one respective connection channel between each of said peripheral unit zones and the active zone of at least one of the bipolar half-plates,
wherein each of said connection channels is formed between the bipolar half-plates by at least two ribs, one of said ribs being provided in one of the bipolar half-plates and protruding over the outer main face thereof, and the other of said ribs being provided in the other of the bipolar half-plates and protruding over the outer main face thereof,
wherein a thickness of each of said connection channels is greater than a combined thickness of the cathode bipolar half-plate and the anode bipolar half-plate.

2. Bipolar plate according to claim 1, wherein
at least one pair of cut-outs is intended to constitute a heat-exchange fluid unit, and the at least one rib which constitutes the connection channel between the peripheral unit zone defined by that pair of cut-outs and the active zone of at least one of the bipolar half-plates opens in the active zone, between the two bipolar half-plates.

3. Bipolar plate according to claim 1, wherein
at least two cut-outs are intended to constitute oxidant units, and each of the connection channels between the respective peripheral unit zones defined by these cut-outs, which are oxidant unit zones, and the active zone of at least one of the bipolar half-plates opens in a region of the active zone located on the outer main face of the cathode bipolar half-plate via a first cut-out which is provided in the cathode bipolar half-plate, and at least two other cut-outs are intended to constitute fuel units, and each of the connection channels between the respective peripheral unit zones defined by these other cut-outs, which are fuel unit zones, and the active zone of at least one of the bipolar half-plates opens in a region of the active zone located on the outer main face of the anode bipolar half-plate via a second cut-out which is provided in the anode half-plate.

4. Bipolar plate according to claim 3, wherein
at least one of the connection channels between at least one of the oxidant unit zones and the active zone of at least one of the bipolar plates is inclined or flared, wherein said inclined or flared connection channel is arranged at a low point of at least one of the cut-outs of the at least one pair of cut-outs that defines the at least one oxidant unit zone.

5. Bipolar plate according to claim 3, wherein
at least one of the connection channels between at least one of the fuel unit zones and the active zone of at least one of the bipolar half-plates is inclined or flared, wherein said inclined or flared connection channel is arranged at a low point of at least one of the cut-outs of the at least one pair of cut-outs that defines the at least one fuel unit zone.

6. Bipolar plate according to claim 4, wherein a plurality of the connection channels between the oxidant and fuel unit zones and the active zone of at least one of the bipolar half-plates are inclined or flared, wherein said inclined or flared connection channels are arranged at all potential low points of the cut-outs that define the oxidant and fuel unit zones.

7. Bipolar plate according to claim 1, wherein at least one of the bipolar half-plates is a metal plate, shaped by means of cutting, for example, using a laser, and drawing.

8. Fuel cell comprising at least one cell which is constituted by a membrane/electrode assembly which comprises at least one bipolar plate according to claim 1.

9. Bipolar plate according to claim 2, wherein
at least two cut-outs are intended to constitute oxidant units, and each of the connection channels between the respective peripheral unit zones defined by these cut-outs, which are oxidant unit zones, and the active zone of at least one of the bipolar half-plates opens in a region of the active zone located on the outer main face of the cathode bipolar half-plate via a first cut-out which is provided in the cathode bipolar half-plate, and
at least two other cut-outs are intended to constitute fuel units, and each of the connection channels between the respective peripheral unit zones defined by these other cut-outs, which are fuel unit zones, and the active zone of at least one of the bipolar half-plates opens in the region of the active zone located on the outer main face of the anode bipolar half-plate via a second cut-out which is provided in the anode half-plate.

10. Bipolar plate according to claim 9, wherein
at least one of the connection channels between at least one of the oxidant unit zones and the active zone of at least one of the bipolar half-plates is inclined or flared, wherein said inclined or flared connection channel is arranged at a low point of at least one of the cut-outs of the at least one pair of cut-outs that defines the at least one oxidant unit zone.

11. Bipolar plate according to claim 9, wherein
at least one of the connection channels between at least one of the fuel unit zones and the active zone of at least one of the bipolar half-plates is inclined or flared, wherein said inclined or flared connection channel is arranged at a low point of at least one of the cut-outs of the at least one pair of cut-outs that defines the at least one fuel unit zone.

12. Bipolar plate according to claim 5, wherein a plurality of the connection channels between the oxidant and fuel unit zones and the active zone of at least one of the bipolar half-plates are inclined or flared, wherein said inclined or flared connection channels are arranged at all potential low points of the cut-outs that define the oxidant and fuel unit zones.

13. Bipolar plate according to claim 2, wherein at least two pairs of the cut-outs are intended to constitute oxidant units, and each of the connection channels between the respective peripheral unit zones defined by these pairs of cut-outs, which are oxidant unit zones, and the active zone of at least one of the bipolar half-plates opens to a region of the active zone located on an the outer main face of the cathode bipolar half-plate via a first cut-out which is provided in the cathode bipolar half-plate, and
at least two other pairs of the cut-outs are intended to constitute fuel units, and each of the connection channels between the respective peripheral unit zones defined by these other pairs of cut-outs, which are fuel unit zones, and the active zone of at least one of the bipolar half-plates opens to a region of the active zone located on an the outer main face of the anode bipolar half-plate via a second cut-out which is provided in the anode half-plate.

14. Bipolar plate according to claim 13, wherein
at least one of the connection channels between at least one of the oxidant unit zones and the active zone of at least one of the bipolar plates is inclined or flared, wherein said inclined or flared connection channel is arranged at a low point of at least one of the cut-outs of the at least one pair of cut-outs that defines the at least one oxidant unit zone.

15. Bipolar plate according to claim 13, wherein
at least one of the connection channels between at least one of the fuel unit zones and the active zone of at least one of the bipolar half-plates is inclined or flared, wherein said inclined or flared connection channel is arranged at a low point of at least one of the cut-outs of the at least one pair of cut-outs that defines the at least one fuel unit zone.

16. Bipolar plate according to claim 14, wherein a plurality of the connection channels between the oxidant and fuel unit zones and the active zone of at least one of the bipolar half-plates are inclined or flared, wherein said inclined or flared connection channels are arranged at all potential low points of the cut-outs that define the oxidant and fuel unit zones.

17. Bipolar plate according to claim 1, wherein one of said ribs has an opening on the bipolar half-plate on which it is provided, whereas the other of said ribs does not have an opening on the other bipolar half-plate on which it is provided.

* * * * *